INVENTOR.
JOHN V. WERME

United States Patent Office 3,315,201
Patented Apr. 18, 1967

3,315,201
STRAIN TRANSDUCER
John V. Werme, Painesville, Ohio, assignor to Bailey
Meter Company, a corporation of Delaware
Filed Mar. 31, 1965, Ser. No. 444,157
4 Claims. (Cl. 338—2)

This invention relates to a strain transducer of the type employing a diaphragm exhibiting free edge mounting characteristics.

Transducers consisting of single-crystal silicon diaphragms having stress-sensitive piezoresistive regions formed by localized diffusion of impurities have been theoretically and experimentally investigated. The advantages of the diffused silicon diaphragm are many and varied. Among the most important of which is the elimination of a bonding agent; use of a single-crystal semi-conductor material throughout eliminates hysteresis and creep problems inherent in conventional strain gauge-diaphragm structures. Another advantage is that the stress sensitivity, or "gauge factor," of semi-conductors is at least an order of magnitude higher than that of metals. The problem that arises when using such diaphragms is that of mounting them to take the fullest advantage of their desirable properties.

The theoretical stress pattern for a diaphragm subjected to a uniform pressure over its surface has been shown by Timoshenko in his work on Theory of Plates and Shells (McGraw-Hill Book Company, New York, 1959), pp. 54–58. At the center of the diaphragm there are two equal components of stress, while near the edge the two components become quite different. The equations relating the stress with radial distance are:

for the clamped edge diaphragm;

$$\sigma_r = \tfrac{3}{8}(g/h^2)[a^2(1+v) - r^2(3+v)]$$
$$\sigma_t = \tfrac{3}{8}(g/h^2)[a^2(1+v) - r^2(1+3v)]$$

for the unclamped diaphragm;

$$\sigma_r = \tfrac{3}{8}(g/h^2)(3+v)(a^2 - r^2)$$
$$\sigma_t = \tfrac{3}{8}(g/h^2)[a^2(3+v) - r^2(1+3v)]$$

where $\sigma_r$ = the radial stress
$\sigma_t$ = the tangential stress
$g$ = the uniform pressure
$h$ = the diaphragm thickness
$v$ = Poisson's ratio.
$r$ = the diaphragm radius and $a$ = the distance from the center at which the stress is measured.

For the clamped edged condition the radial and tangential stress changes from positive to negative from the center of the diaphragm to its edge. In the unclamped case the radial and tangential stress varies from zero at the center to a maximum at the diaphragm edge. The stress reversal in the clamped edge condition produces undesirable characteristics in that a strain sensitive region can be subjected to both positive and negative components. When all four legs of a Wheatstone bridge circuit are diffused into the diaphragm, care must be exercised to assure each leg of the bridge is in either a positive or negative stress area. In the unclamped case all the strain sensitive regions are in a positive stress area and location of the strained sensitive regions are not as critical.

The theoretical deflection of a diaphragm subjected to a uniform pressure has also been shown by Timoshenko in his previously cited book on the Theory of Plates and Shells. For the clamped condition the maximum deflection is given by the equation:

$$\omega_m = \frac{ga^4}{64D}$$

where $$D = \frac{Eh^3}{12(1-v)}$$

and E is the modulus of elasticity of the material.

For the unclamped diaphragm the equation for the maximum deflection is:

$$\omega_m = \frac{(5+v)ga^4}{64(1+v)D}$$

If Poisson's ratio, $v$, is taken as 0.35, which is a somewhat universally accepted figure by those working in and skilled in the art of silicon diaphragm transducers, the deflection in the unclamped condition is about four times as great as that for the clamped condition. Thus, for a given pressure, $g$, the change in resistance of a resistor diffused into a silicon diaphragm will be greater for the unclamped condition as opposed to the clamped.

In addition to the foregoing advantages of the unclamped transducer diaphragm over the clamped, there is also the reduction of stress introduced by the clamping action of the transducer housing. Any stress in the housing or clamping fixture, such as those introduced by piping connections or mounting brackets, would be transmitted to the diaphragm and the sensing elements. The stress sensitive piezoresistive regions would be placed in varying degrees of stress which could not be predicted and which will seriously affect the pressure related output signal.

Ambient temperatures surrounding the housing or clamping fixture could also cause erroneous readings in the strain-sensitive piezoresistive elements. In the clamped condition, the clamping fixture would restrict the physical changes of the diaphragm due to ambient temperature changes should there be a mismatch of thermocoefficients between the silicon and the clamping fixture. With the unclamped diaphragm there is unrestricted change in the physical dimensions of the diaphragm which minimizes the affect of thermally induced stress.

Mechanically there are also advantages of the unclamped diaphragm over the clamped. Silicon is a rather brittle material and extreme care must be exercised to prevent chipping or fracture during the fabrication process.

An object of my invention is to provide a strain transducer having an unclamped diaphragm.

Another object of my invention is to provide a strain transducer having a diaphragm mounted in an elastomer, such as rubber.

Other objects and advantages of my invention will be apparent from the following description taken in conjunction with the drawings, wherein.

Figure 1:
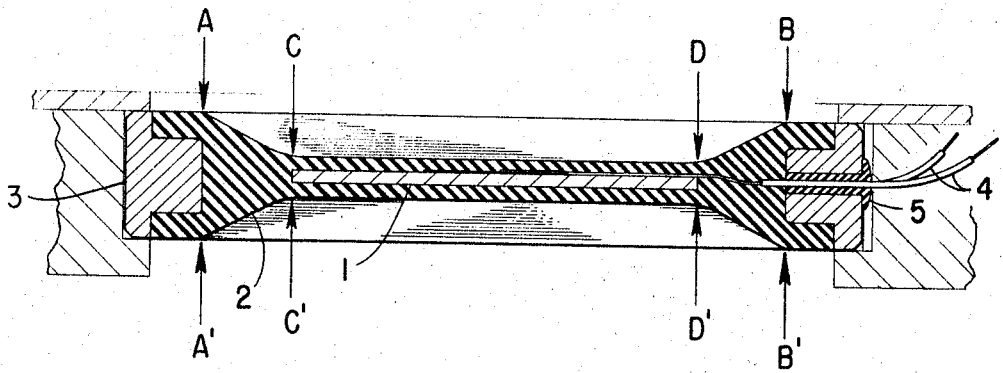
FIG. 1 is a cross sectional view taken through the center of the strain transducer.

Referring to the FIG. 1, I show a free edge mounted diaphragm 1 encapsulated in a protective shroud 2. The diaphragm can either be of a semi-conductor material as previously described or a metal such as stainless steel. A typical diaphragm of semi-conductor material would consist of an n-type silicon wafer about 1 inch in diameter with p-type impurities (boron) diffused into the n-type wafer. Boron is usually chosen as the impurity because it is a well-behaved diffusant and p-type piezoresistive elements exhibit better linearity than their n-type counterparts. Although there are many resistor configurations that can be diffused into the silicon base material, the general practice is to diffuse all four arms of a Wheatstone bridge circuit.

When using a metal disk diaphragm, the strain responsive elements are bonded to the diaphragm surface prior to encapsulation. Either wire or semi-conductor strain elements are used, usually the semi-conductor type are desired because of their higher gauge factor or sensitivity. As in the case of the silicon diaphragm, all four legs of the bridge circuit are bonded to the diaphragm.

The protective shroud 2 is an elastomer type material such as silicone rubber. There are many advantages to encapsulating the diaphragm other than to gain the benefits of free edge mounting. For instance, the particular shape of the shroud I have shown provides excellent over deflection protection for the diaphragm when used in a differential pressure transmitter. In a differential transmitter, the unit of FIG. 1 would be mounted in a housing having a high pressure chamber on one side of the diaphragm and a low pressure chamber on the other. The pressure differential would cause the diaphragm 1 to deflect. The vertical distance from a line joining points A and B to the surface between points C and D equals the maximum deflection permissible for the diaphragm 1. A back-up surface mounted flush with the upper surface of the shroud 2 prevents the diaphragm from being deflected more than a predetermined amount. Another somewhat important advantage to encapsulation is the protection the encapsulating material provides against corrosive fluids or atmospheric conditions and the protection afforded against particles of foreign matter carried by the measured fluid.

Surrounding the protective shroud 2 is a metal retaining ring 3 having the same or nearly the same, coefficient of expansion as the diaphragm 1. The retaining ring 3, as the name implies, would be connected to a stationary body, as shown schematically, to hold the unit of FIG. 1 when a force is applied. To connect leads to the sensitive elements of the diaphragm 1 a passage is formed in the metal retaining ring through which lead wires 4 pass. An epoxy seal 5 securely fastens the leads 4 to the retaining ring 3.

Figure 2:
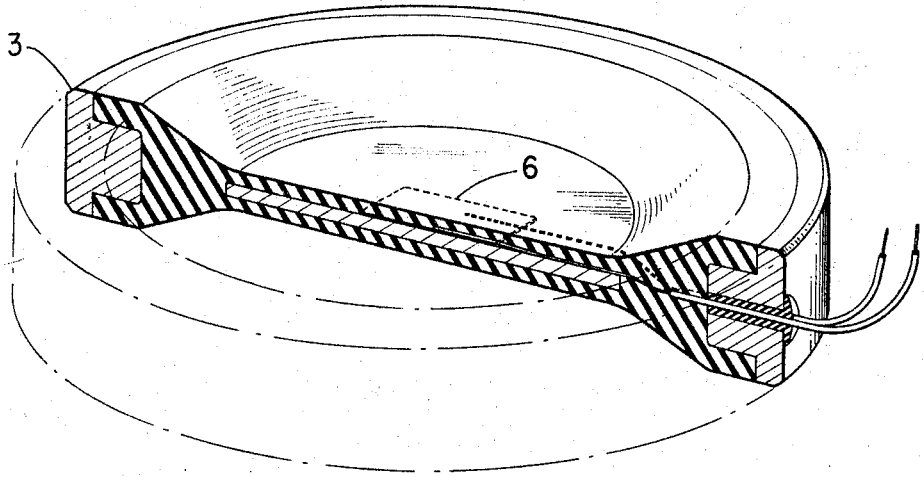
FIG. 2 shows a cross sectional prospective view, partly in phantom.

FIG. 2 shows the dish shaped circular design of the strain transducer; the diaphragm is metallic, such as stainless steel. Bonded to the diaphragm, prior to encapsulation, is a strain gauge 6, either wire or of semiconductor type.

The diaphragm in a typical embodiment of my invention was 1 inch in diameter and 0.032 inch thick. The maximum deflection, including both static and operating, was calculated to be 0.0275 inch for the maximum expected pressure. The thickness of the shroud between points C and C' was chosen considering the protection afforded to the diaphragm from corrosive fluids. The thin layers of rubber covering the diaphragm itself have very little affect on the free edge mounting characteristics of the diaphragm. For protection purposes, I chose a thickness of $3/32$ of an inch. The size of the shroud from point A to point B and the thickness from point A to point A' is calculated from the equation:

$$y = F/2\pi G \left( \frac{D_0 - D_j}{L_0 D_j - L_j D_0} \right) \log_e \frac{L_0 D_j}{L_j D_0}$$

where $y$ = the static and operating deflection of the diaphragm
$G$ = modulus of rigidity
$D_0$ = diameter from points A to B
$D_j$ = diameter of the diaphragm
$L_0$ = thickness of the shroud from point A to A'
$L_j$ = thickness of the shroud from point C to point C'
$F = A_e g$
$A_e$ = effective diameter area
$g$ = maximum operating pressure The effective area of the diaphragm, $A_e$, is greater than the diaphragm area itself because the elastomer type material from which the shroud is made deflects under the force of a pressure applied between points A and B. The equation for the effective area is:

$$A_e = A_j + \tfrac{2}{3}(A_0 + A_j)$$

where $A_j$ = the diaphragm area
and $A_0$ = the area of the circle having a diameter $D_0$.

When using the deflection equation to determine the shroud dimensions, it must be assumed that the forces acting at the edge of the diaphragm are acting only in shear and that no moments exist. From actual experimentation it has been shown this assumption is valid and the diaphragm truely acts as a simple edge supported member. With the diaphragm diameter, the maximum deflection and the shroud thickness from point C to point C' determined by other considerations, only two dimensions remain to be calculated, these are $D_0$ and $L_0$. Because there is only one equation and two unknowns a trial and error method must be used and one of the unknowns given an assumed value. I assumed the shroud thickness, $L_0$ and calculated the shroud diameter, $D_0$.

The strain transducer on which my invention was perfected had a shroud thickness, $L_0$, of $5/16$ inch, a shroud diameter, $D_0$, of $17/16$ inches, a modulus of rigidity, $G$, of 180 and an effective area, $A_e$, of 1.3438 square inches. The remaining dimensions were as given previously.

It will be understood that various changes in the details, materials, and arrangements of parts, which have been herein described and illustrated in order to explain the nature of my invention, may be made by those skilled in the art without departing from the principle and scope of the invention as expressed in the appended claims.

What I claim as new and desire to secure by Letters Patent of the United States is:

1. A strain transducer comprising a diaphragm having strain sensitive portions thereon responsive to the deflection of said diaphragm, a shroud of elastomeric material having a peripheral edge and completely encapsulating said diaphragm to provide free edge support and to protect the strain sensitive portions from corrosive atmospheres and fluids and a metal retaining ring bonded to and surrounding the peripheral edge of said shroud for mounting said diaphragm.

2. A strain transducer as set forth in claim 1 wherein the elastomeric material is a silicone rubber.

3. A strain transducer as set forth in claim 1 wherein said diaphragm is a silicon crystal and the strain sensitive portions are piezoresistive regions formed by diffusion of impurities in said crystal.

4. A strain transducer as set forth in claim 1 wherein said diaphragm is a metal disk and the strain responsive portions are wire elements bonded to the disk.

References Cited by the Examiner

UNITED STATES PATENTS

| | | | |
|---|---|---|---|
| 3,009,056 | 11/1961 | Bone et al. | |
| 3,071,745 | 1/1963 | Stedman | 338—2 |
| 3,093,806 | 6/1963 | Gutterman | 338—42 |
| 3,122,717 | 2/1964 | Motsinger | 338—4 |
| 3,174,125 | 3/1965 | Curby | 338—47 |
| 3,205,464 | 9/1965 | Schwartz | 338—2 |
| 3,235,826 | 2/1966 | Crites | 338—4 |

ANTHONY BARTIS, *Primary Examiner.*

RICHARD M. WOOD, *Examiner.*

W. D. BROOKS, *Assistant Examiner.*